United States Patent [19]

Hirotani et al.

[11] 4,416,487
[45] Nov. 22, 1983

[54] SLIDING ROOF STRUCTURE FOR AUTOMOBILE BODIES

[75] Inventors: Yasunari Hirotani; Yoshimitsu Tanaka, both of Hiroshima, Japan

[73] Assignee: Toyo Kogyo Co., Ltd., Hiroshima, Japan

[21] Appl. No.: 292,720

[22] Filed: Aug. 13, 1981

[30] Foreign Application Priority Data

Aug. 15, 1980 [JP] Japan ................................ 55-112817

[51] Int. Cl.³ .............................................. B60J 7/10
[52] U.S. Cl. .................................... 296/222; 296/216
[58] Field of Search ............... 296/213, 216, 221, 222, 296/223

[56] References Cited

U.S. PATENT DOCUMENTS

| | | | |
|---|---|---|---|
| 3,016,263 | 1/1962 | Rehmann | 296/222 |
| 3,333,889 | 8/1967 | Golde | 296/222 |
| 3,863,979 | 2/1975 | Bienert | 296/222 |
| 4,018,476 | 4/1977 | Lutz | 296/222 |
| 4,159,144 | 6/1979 | Ehlen | 296/222 |
| 4,210,359 | 7/1980 | Mori | 296/222 |
| 4,328,990 | 5/1982 | Yoshida | 296/222 |

FOREIGN PATENT DOCUMENTS

| | | | |
|---|---|---|---|
| 695609 | 9/1965 | France | 296/222 |
| 614514 | 12/1960 | Italy | 296/222 |
| 56-34521 | 4/1981 | Japan | 296/222 |
| 1038236 | 8/1966 | United Kingdom | 296/222 |
| 2034254 | 6/1980 | United Kingdom | 296/222 |

Primary Examiner—Joseph F. Peters, Jr.
Assistant Examiner—Ross Weaver
Attorney, Agent, or Firm—Fleit, Jacobson, Cohn & Price

[57] ABSTRACT

A sliding roof structure for an automobile body including a roof panel formed with a roof opening defined by a downwardly bent peripheral flange, a roof side rail formed at each side of the roof panel, a reinforcement member of an inverted channel shape having a downwardly extending inboard flange, a substantially horizontal top wall and a downwardly extending outboard flange. The reinforcement member is attached at the inboard flange with the peripheral flange of the roof panel and a sliding roof carrying frame is attached to the roof side rails through brackets. The reinforcement member has locating pins downwardly extending for engagement with locating holes in the frame.

8 Claims, 8 Drawing Figures

SLIDING ROOF STRUCTURE FOR AUTOMOBILE BODIES

The present invention relates to automobile bodies having sun-roof structures and more particularly to sliding type sun-roof structures.

Conventionally, sliding-roof structures have a roof panel formed with an opening which has a peripheral portion attached with a fixing plate such as by spot welding. The fixing plate has an opening corresponding to the opening of the roof panel and is adapted to support a sliding-roof carrying frame. The sliding-roof carrying frame has an upper peripheral flange which is secured to the fixing plate by means of bolts or similar fasteners. Further, the sliding-roof carrying frame is provided at the opposite side portions thereof with brackets which are attached to roof side rails so that the load on the frame is transmitted to the roof side rails.

In the conventional structures, however, problems have been encountered in that a lot of parts and labours have been required for securing by bolts the sliding roof carrying frame at the flange portion thereof to the fixing plate and at the side portions to the brackets. Further, in this type of structure, since it is required to have the flange of the frame attached to the fixing plate before the frame is attached to the roof side panels, the roof panel is subjected through the fixing plate to the weight of the frame until the opposite side portions are attached to the roof side rails. It has therefore been experienced that the roof panel of the automobile body is deformed due to the weight of the sliding roof carrying frame during the assembling process because the weight of the frame is not small and the body roof is so designed that it can only withstand the weight of the frame after the side portions of the frame are attached through the brackets to the roof side rails.

In order to solve the problems, the automobile body roof panel may be so designed that it has a sufficient strength to withstand the weight of the frame before it is attached to the roof side rails. However, the solution is not recommendable because the roof panel has unnecessarily large strength after the assembly is completed and the weight and the manufacturing cost are therefore correspondingly increased. In the U.S. application Ser. No. 121,971 filed on Feb. 15, 1980, there is disclosed a sliding roof structure wherein the roof panel is formed at each of the opposite side portions of the roof opening with a reinforcement panel which is attached at the opposite sides to the roof panel to provide a reinforcement structure of closed cross-section and the sliding roof carrying frame is attached at the upper peripheral flange with the reinforcement panel and the at each side portion to the roof side rail through suitable brackets. This proposed structure still has a problem of deformation of the roof panel because the weight of the sliding roof carrying frame is transmitted to the roof panel through the outboard side edge of the reinforcement panel which is welded to the roof panel.

It is therefore an object of the present invention to provide a sliding roof structure for an automobile body which is simple and can be constructed with less number of parts without any risk of producing deformations in the roof panel.

Another object of the present invention is to provide a sliding roof structure which can be easily and less expensively assembled without giving any bad appearance to the roof panel.

The above and other objects can be accomplished according to the present invention by a sliding roof structure for an automobile body including a roof panel formed with a roof opening defined by a downwardly bent peripheral flange, a roof side rail formed at each side of the roof panel, a reinforcement member of an inverted channel shape having a downwardly extending inboard flange, a substantially horizontal top wall and a downwardly extending outboard flange, said reinforcement member being attached at said inboard flange with said peripheral flange of the roof panel, a sliding roof carrying frame for movably carrying a sliding roof and having an opening corresponding to the opening of the roof panel and disposed beneath the roof panel, bracket means secured to said roof side rail, means for connecting said sliding roof carrying frame to said bracket means, locating means provided on said reinforcement member at the outboard flange for cooperating with said sliding roof carrying frame for locating the latter.

Preferably, the frame is connected through second bracket means with the first mentioned bracket means. The sliding roof carrying frame may be formed at an outer peripheral portion thereof with a horizontally extending flange which is adapted to be located beneath the top wall of the reinforcement member and sealing means, preferably of a resilient foamed material, is provided between the horizontal flange of the frame and the top wall of the reinforcement member. The locating means may be in the form of at least one pin downwardly extending from said reinforcement member and the sliding roof carrying frame may be formed with at least one locating hole for engagement with the pin. Alternatively, the locating means may be provided by bolts which extend downwardly from said reinforcement member and are adapted to be inserted into locating holes formed in the sliding roof carrying frame. The reinforcement member may then be connected to the frame by threading nuts to the bolts. The bolts and nuts may constitute said means for connecting the sliding roof carrying frame to the first mentioned bracket means.

The above and other objects and features of the present invention will become apparent from the following descriptions of preferred embodiments taking reference to the accompanying drawings, in which.

Figure 1:
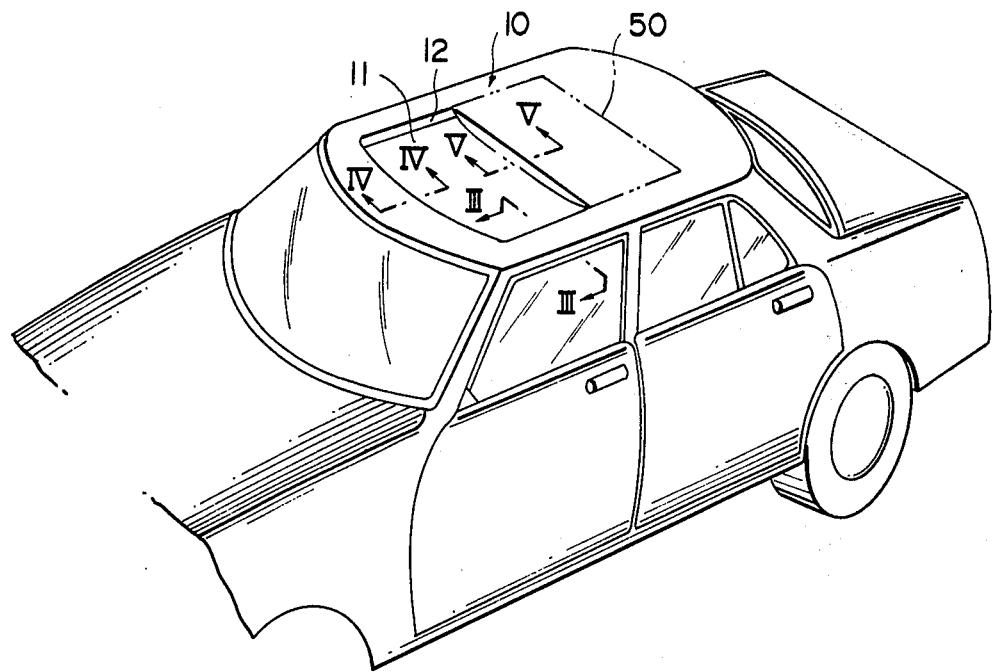
FIG. 1 is a fragmentary perspective view of an automobile body having a sliding roof structure to which the present invention can be applied.
Figure 3:
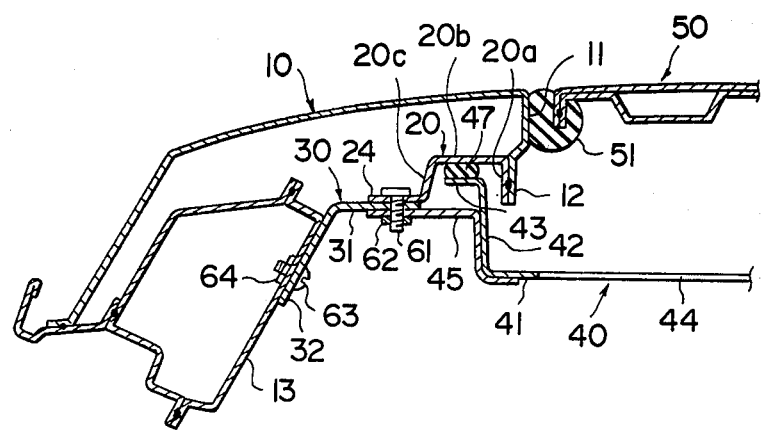
FIG. 3 is a sectional view taken along the line III—III in FIG. 1.
Figure 5:
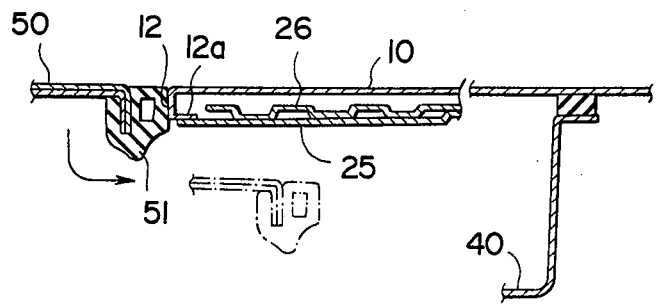
FIG. 5 is a sectional view taken along the line V—V in FIG. 1.

Referring now to the drawings, particularly to FIG. 1, there is shown an automobile body having a sliding roof structure. The body includes a roof panel 10 formed with a substantially rectangular opening 11. As shown in FIG. 3, a roof side rail 13 of a closed cross-section is formed at each side of the roof panel 10. The roof panel has a downwardly extending peripheral flange 12 formed along the periphery of the opening 11. At the rear edge of the opening 11, the lower end of the flange 12 is bent rearwardly as shown by the reference 12a for the purpose which will be described later. Beneath the roof panel 10, there is disposed a fixing plate 20 of a substantially rectangular shape having an opening 21 corresponding to the opening 11 in the roof panel 10. As shown in FIG. 3, the fixing plate 20 has a pair of side portions 23 each of an inverted channel shape having a downwardly extending inboard flange 20a, a substantially horizontal top wall 20b and a downwardly extending outboard flange 20c. The inboard flange 20a is attached to the lower portion of the peripheral flange 12 of the roof panel 10 by spot welding. The fixing plate 20 further has a front portion 22 which is also of an inverted channel shape and attached to the peripheral flange 12 of the roof panel 10 in a similar manner as the side portions. The rear portion 25 of the fixing plate 20 is of a flat configuration as shown in FIG. 5 and a beaded reinforcement plate 26 is welded to the rear portion 20d. The front edge of the rear portion 25 is welded to the rearwardly bent portion 12a of the peripheral flange 12 of the roof panel 10.

Figure 2:
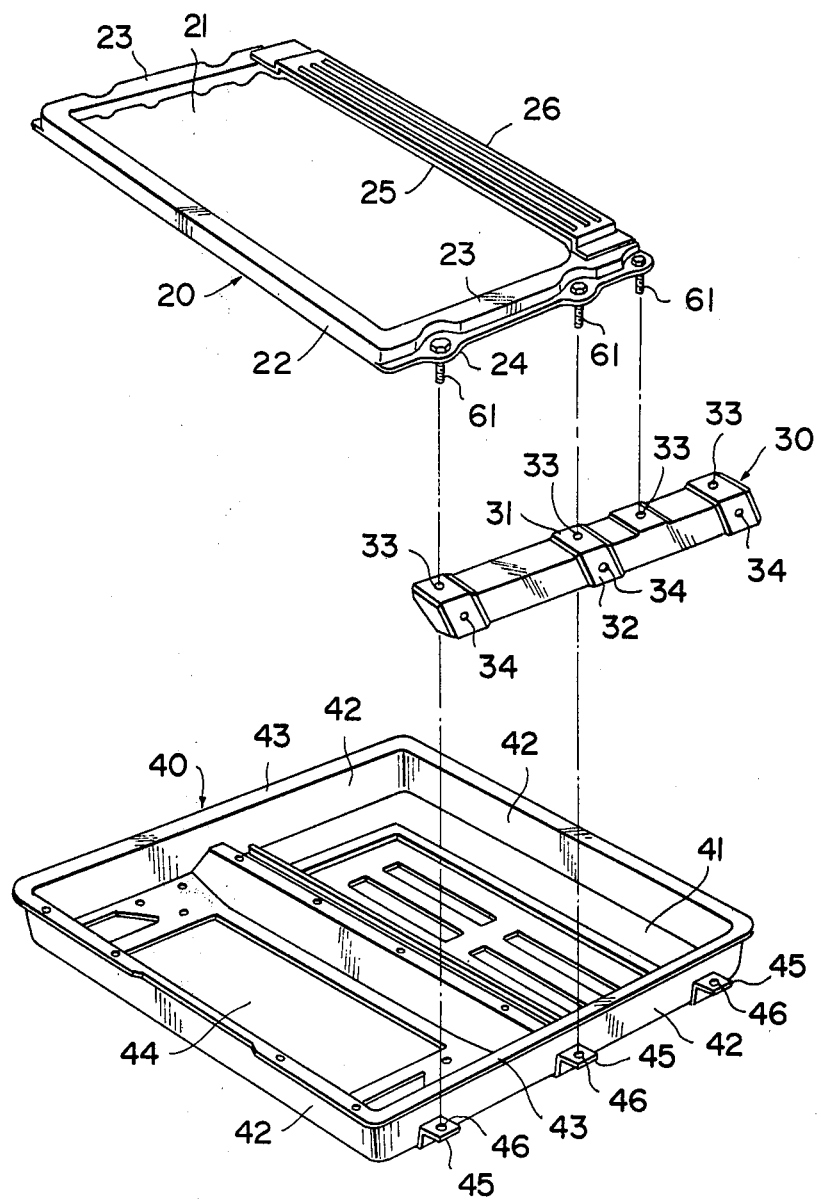
FIG. 2 is an exploded view of a sliding roof structure in accordance with one embodiment of the present invention.
Figure 4:
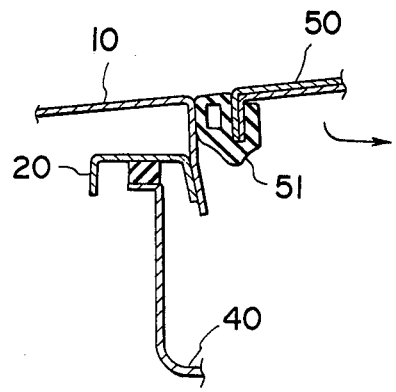
FIG. 4 is a sectional view taken along the line IV—IV in FIG. 1.

Beneath the fixing plate 20, there is a sliding roof carrying frame 40 which is attached to each of the roof side rails 13 through a bracket 30. The frame 40 includes a bottom wall 41 and an upright peripheral wall 42 which is formed with an outwardly extending flange 43. The bottom wall 41 of the frame 40 is formed at the front portion thereof with an opening 44 which corresponds to and is adapted to be aligned with the opening 11 of the roof panel 10 and the opening 21 of the fixing plate 20. As shown in FIG. 2, the frame 40 is provided at each side portion with second brackets 45 having bolts holes 46.

The side portion 23 of the fixing plate 20 is formed at the lower end of the outboard flange 20c with a horizontal flange 24 where locating and connecting bolts 61 are fixed so as to extend downwardly. The locations of the front two of the bolts 61 are such that they are aligned with the front two of the bolt holts 46 in the second brackets 45. The connecting bracket 30 includes a substantially horizontal portion 31 which is adapted to be located along the horizontal flange 24 of the fixing plate 20 and a slanted portion 32 which is adapted to be located along the roof side rail 13. In the horizontal portion 31, the bracket 30 is formed with bolt holes 33. The front two of the bolt holes 33 are aligned with the front two of the bolts 61 and with the front two of the bolt holes 46 in the brackets 45. The third bolt hole 33 is aligned with the rearmost bolt 61 whereas the rearmost bolt hole 33 is aligned with the rearmost bolt hole 46 in the bracket 45.

The bracket 30 is formed at the slanted portion 32 with bolt holes 34 through which fastening bolts 63 are inserted. The bolts 63 are further inserted into the roof side rail 13 and nuts 64 are engaged with the bolts 63 so as to secure the bracket 30 to the roof side rail 13 as shown in FIG. 3. The bolts 61 which are welded at their heads to the flange 24 of the fixing plate 20 are inserted into the front three of the bolt holes 33. In assembling operation, the fixing plate 20 is at first attached to the roof panel 10 by locating it at the correct position and welding the flange 20a to the flange 12 of the roof panel 10 by spot welding technique. Then, the bracket 30 is fitted in position by inserting the bolts 61 on the flange 24 of the fixing plate 20 into the bolt holes 33 and tightening the bracket 30 by means of the bolts 63 and the nuts 64 as shown in FIG. 3. The rearmost bolt 61 is engaged with a nut (not shown) to secure the bracket 30 to the fixing plate 20. The frame 40 is then put into position by engaging the bolt holes 46 in the front two brackets 45 on the frame 40 with the front two bolts 61 on the fixing plate 20. The bolts 61 on the fixing plate 20 thus function as the means for correctly locating the frame 40. The bolts 61 are then engaged with nuts 62 to secure the frame 40 to the bracket 30 and also to the fixing plate 20. The upper peripheral flange 43 of the frame 40 is located beneath the horizontal wall 20b of the fixing plate 20 and a weather-tight sealing strip 47 is provided between the wall 20b and the flange 43. A further bolt (not shown) may be inserted through the rearmost bolt hole 33 in the bracket 30 and the bolt hole 46 in the rearmost bracket 45 on the frame 40.

A sliding roof assembly 50 is put in the sliding roof carrying frame 40 at a suitable stage so that it can slide in the longitudinal direction along the frame 40. The sliding roof assembly 50 has a weather-tight sealing strip 51 along its periphery so that it engages with the flange 12 when the assembly 50 is in the closed position.

Figure 6:
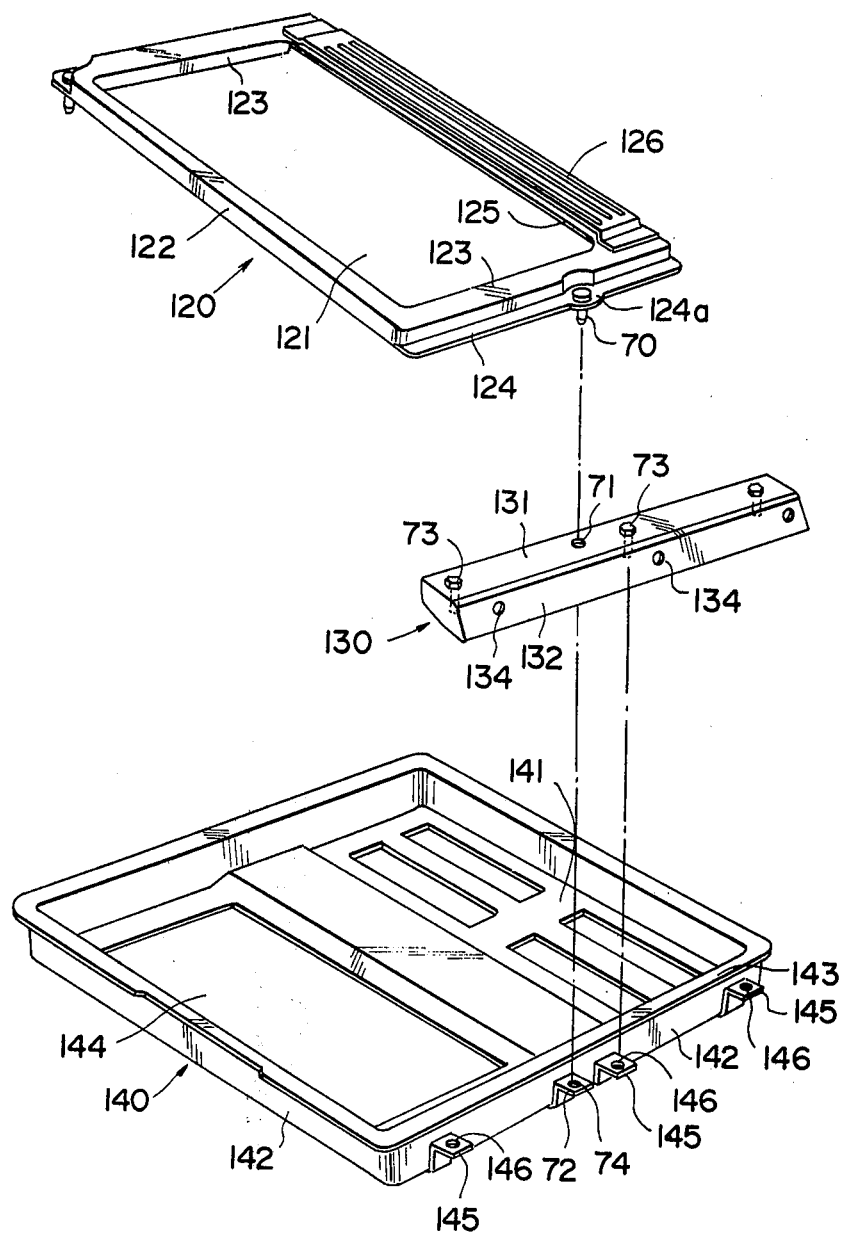
FIG. 6 is an exploded view showing another embodiment of the present invention.
Figure 7:
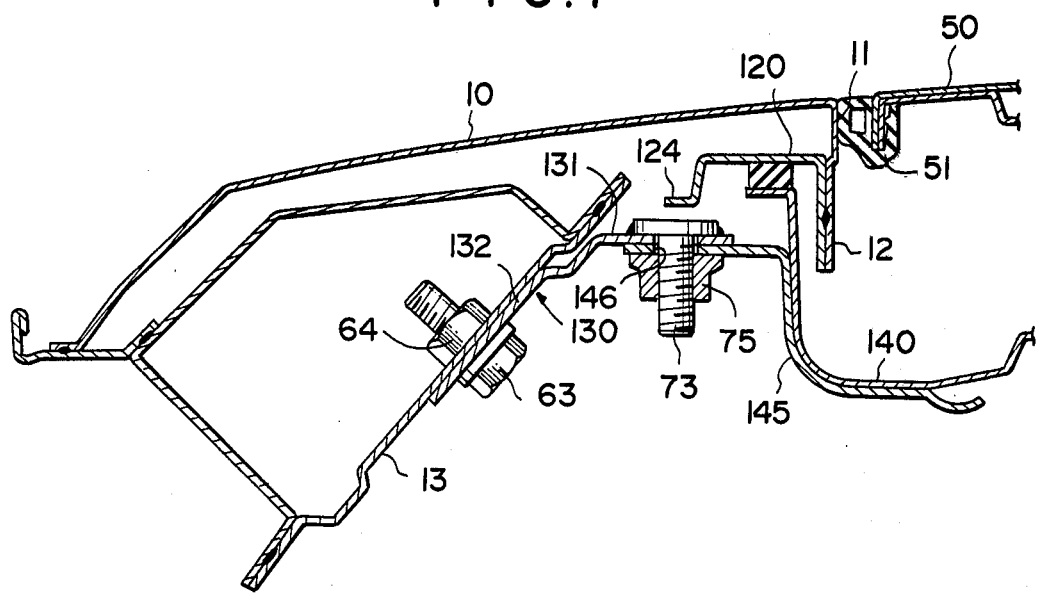
FIG. 7 is a sectional view similar to FIG. 3 but showing the embodiment of FIG. 6; and, FIG. 8 is a sectional view taken through the locating pin.
Figure 8:
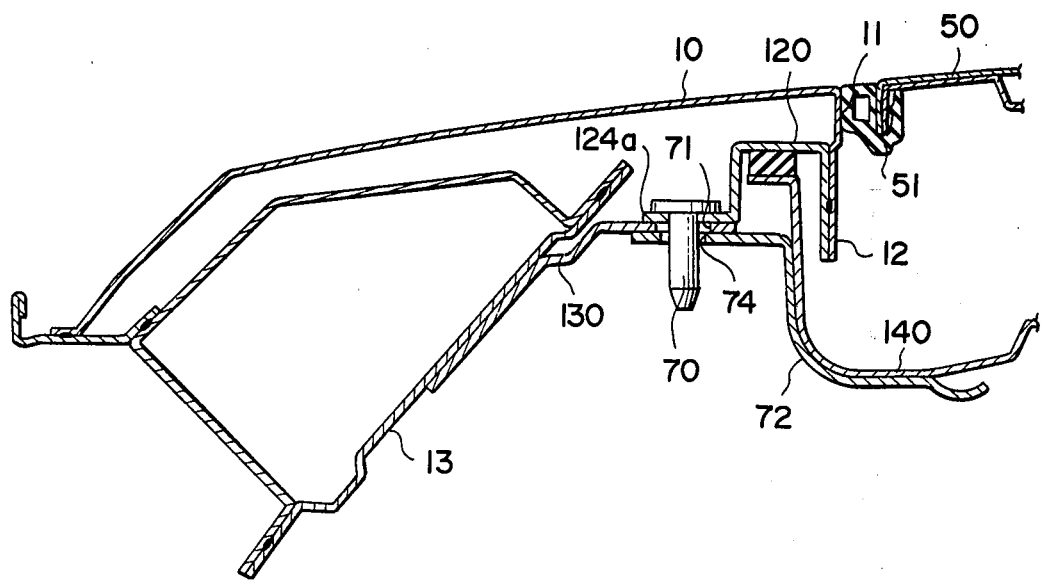

Referring now to FIG. 6, the embodiment shown therein includes a substantially rectangular fixing plate 120 having an opening 121 defined by a front portion 122, a pair of side portions 123 and a rear portion 125. A beaded reinforcement member 126 is attached to the rear portion 125 as in the previous embodiment. The side portion 123 has a side flange 124 which is formed with a recessed pin seat 124a where a locating pin 70 is welded at its head. The locating pin 70 extends downwardly from the flange 124. The fixing plate 120 is connected with the flange 12 of the roof panel 10 by spot welding as in the previous embodiment.

As in the previous embodiment, there is provided a connecting bracket 130 which has a horizontal portion 131 and a slanted portion 132. In the horizontal portion 131, there is formed a hole 71 which is adapted to receive the locating pin 70. The slanted portion 132 of the connecting bracket 130 is formed with bolt holes 134 and the bracket 130 is connected with the roof side rail 13 by means of fastening bolts 63 inserted through the bolt holes 134 in the bracket 130 and threaded into nuts 64 which are fitted to the roof side rail 13. The bracket 130 is further provided at the horizontal portion 131 with fastening bolts 73 which extend downwardly from the horizontal portion 131.

The sliding roof structure further includes a sliding roof carrying frame 140 which has a configuration similar to the frame 40 in the previous embodiment so that corresponding parts are designated by the same reference characters as in the previous embodiment with addition of number 100. At the side peripheral wall 142 of the frame 140, there is provided a locating bracket 72 which has a locating hole 74 adapted to be engaged with the locating pin 70 on the fixing plate 120. Further, the side peripheral wall 142 is provided with second connecting brackets 145 having bolt holes 146 for receiving the bolts 73 on the brackets 130.

During an assembly procedure, the fixing plate 120 is at first fitted in position as in the previous embodiment and the connecting bracket 130 is placed by engaging the locating hole 71 with the pin 70. Then, the bracket 130 is secured to the roof side rail 13 by engaging the bolts 63 with the nuts 64. The frame 140 is thereafter placed in position by engaging the hole 74 in the locating bracket 72 with the pin 70 on the fixing plate 120 and having the bolts 73 on the bracket 130 inserted into the bolt holes 146 in the brackets 145. Nuts 75 are then engaged with the bolts 73 to secure the frame 140 to the bracket 130. In this embodiment, it will be noted that the sliding roof carrying frame 140 is not connected with the fixing plate 120. This is advantageous because there is no possibility of the roof panel around the roof opening being distorted even when there are certain amounts of dimensional errors in the sheet metal parts constituting the structure.

The invention has thus been shown and described with reference to specific embodiments, however, it should be noted that the invention is in no way limited to the details of the illustrated structures but changes and modifications may be made without departing from the scope of the appended claims.

We claim:

1. A sliding roof structure for an automobile body including a roof panel formed with a roof opening defined by a downwardly bent peripheral flange, a roof side rail formed at each side of the roof panel, a reinforcement member of an inverted channel shape having a downwardly extending inboard flange, a substantially horizontal top wall, and a downwardly extending outboard flange having a lower end contiguous with an outwardly extending horizontal flange, said reinforcement member being attached at said inboard flange with said peripheral flange of the roof panel, a sliding roof carrying frame for movably carrying a sliding roof and having an opening corresponding to the opening of the roof panel and disposed beneath the roof panel, bracket means secured to said roof side rail, means for connecting said sliding roof carrying frame to said bracket means, downwardly projecting locating means provided on said reinforcement member at the horizontal flange for cooperating with said sliding roof carrying frame for locating the latter.

2. A sliding roof structure in accordance with claim 1 in which said frame is connected through second bracket means with the first mentioned bracket means, said second bracket means being located beneath the first bracket means so that said frame can be brought into position from lower side.

3. A sliding roof structure in accordance with claim 1 in which said sliding roof carrying frame includes a bottom wall and an upright peripheral wall having an upper end formed with a horizontally extending flange which is adapted to be located beneath the top wall of the reinforcement member and sealing means is provided between the horizontal flange of the frame and the top wall of the reinforcement member.

4. A sliding roof structure in accordance with claim 1 in which said locating means is also fastening means for connecting the reinforcement member with the sliding roof carrying frame.

5. A sliding roof structure in accordance with claim 1 in which said locating means includes at least one locating pin for slidable engagement with at least one locating hole in said sliding roof carrying frame so that the frame is not connected with said reinforcement member.

6. A sliding roof structure in accordance with claim 1 in which said bracket means secured to said roof side rail has a horizontal portion which is adapted to be placed beneath the horizontal flange of the reinforcement member to be engaged therewith.

7. A sliding roof structure in accordance with claim 6 in which said locating means includes pin-shaped locating members provided on the horizontal flange of the reinforcement member, said horizontal portion of the bracket means having locating holes for engagement with said locating members, said reinforcement member and said bracket means secured to the roof side rail being in contact with each other at portions where said locating members and said locating holes are provided, said reinforcement member and said bracket means secured to the roof side rail having portions where they are spaced apart, fixing means being provided in the spaced apart portions for connecting the bracket means on the roof side rail with the sliding roof carrying frame without any interference between the fixing means and the reinforcement member.

8. A sliding roof structure for an automobile body including a roof panel formed with a roof opening defined by a downwardly extending peripheral flange, a roof side rail formed at each side of the roof panel, a reinforcement member disposed along said peripheral flange of the roof panel, a sliding roof carrying frame for movably carrying a sliding roof and having an opening corresponding to the opening of the roof panel, said frame being disposed beneath the roof panel, bracket means secured to said roof side rail, means for connecting said sliding roof carrying frame to said bracket means, locating pins extending downwardly from said reinforcement member, said sliding roof carrying frame being formed with locating holes for engagement with said locating pins.

* * * * *